Aug. 4, 1964  J. S. BRADLEY ETAL  3,143,648
EXPLORATION FOR HYDROCARBONS BY DETECTING
GAS SEEPS IN THE ATMOSPHERE
Filed Jan. 26, 1961  6 Sheets-Sheet 1

ATTEST
Charles F. Steininger

INVENTORS.
John S. Bradley
William H. Luehrmann
BY Carl A. Youngman
John R. Gunter Attorney
Herbert E. Birch

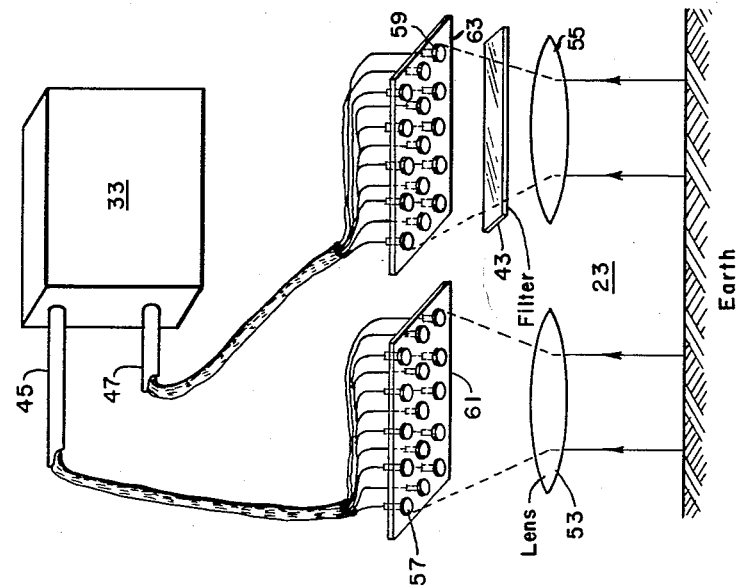
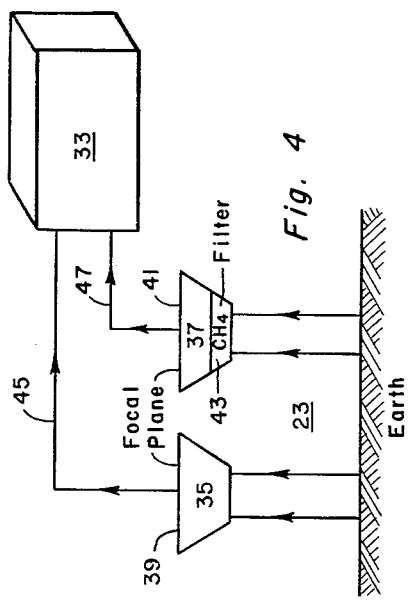
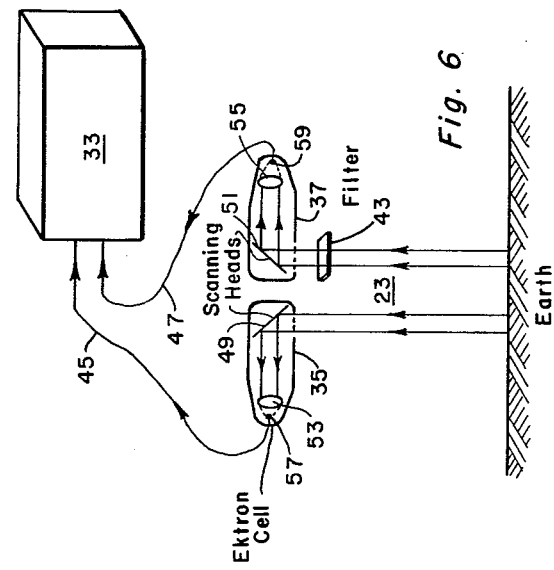
INVENTORS.
John S. Bradley
William H. Luehrmann
Carl A. Youngman
John R. Gunter Aug. 4, 1964

J. S. BRADLEY ETAL
EXPLORATION FOR HYDROCARBONS BY DETECTING
GAS SEEPS IN THE ATMOSPHERE 3,143,648

Filed Jan. 26, 1961

ATTEST
Charles F. Steininger

INVENTORS.
John S. Bradley
William H. Luehrmann
BY Carl A. Youngman
John R. Gunter
Attorney United States Patent Office 3,143,648
Patented Aug. 4, 1964

3,143,648
EXPLORATION FOR HYDROCARBONS BY DETECTING GAS SEEPS IN THE ATMOSPHERE
John S. Bradley, William H. Luehrmann, and Carl A. Youngman, Dallas, Tex., and John R. Gunter, Caracas, Venezuela, assignors to The Atlantic Refining Company, Philadelphia, Pa., a corporation of Pennsylvania
Filed Jan. 26, 1961, Ser. No. 85,081
9 Claims. (Cl. 250—43.5)

The present invention relates to a method and apparatus for exploring for petroliferous deposits. More particularly, the present invention relates to an air-borne method and apparatus for locating subterranean petroliferous deposits. In a still more specific aspect, the present invention relates to an air-borne method and apparatus for hydrocarbon seeps detection which is suited to high-speed, large area reconnaissance missions.

The relentless search for oil deposits during the past several decades has covered most of the civilized and accessible areas of the world's surface. Today, the search is being extended into the vast reaches of the arctic and the tropics as well as inaccessible deserts and mountainous terrain. As this search extends into the more remote and inaccessible regions of the world, the need for an exploration tool suitable for high-speed, large area reconnaissance becomes more pressing.

Presently-used methods and systems, while in most cases adequate for their original purposes, do not meet the need for a high-speed, highly mobile reconnaissance tool for pinpointing areas of interest in vast unexplored regions. Conventional seismic reflection and refraction prospecting, electrical prospecting, magnetic prospecting, gravimetric prospecting, radioactive prospecting, geochemical prospecting, etc., are extremely limited in their applications since they must traverse the earth's surface and, therefore, are restricted in their speed and maneuverability. Water-borne devices conducting seismic operations, seeps detection and allied explorations are similarly restricted to traversing water covered areas. Their speed and maneuverability are likewise limited.

Although air-borne radioactive, gravimetric, and magnetic surveys have been conducted, they do not provide enough information for a satisfactory large scale reconnaissance tool.

The air-borne radioactive survey is relatively new and has not yet been accepted by the industry since no adequate correlation has been found between radioactive anomalies and petroliferous deposits.

The air-borne gravimetric survey produces very gross information and is therefore limited to delineating large continental structures, such as mountain ranges, large basins, etc. To date, the best readings obtained by air-borne gravimetric surveys are in the vicinity of 5 milligals, whereas a sensitivity of approximately .1 to .01 milligal is required to detect possible oil-bearing structures.

The air-borne magnetic survey is the only type of air-borne survey generally accepted by the industry. Even in this type of operation, the information obtained is very limited. Magnetic surveys yield information relating essentially to the basement of igneous or metamorphic rocks which, of course, do not contain oil deposits. It is not a localizing tool and even under the best conditions, the system can only delineate large basement anomalies which may or may not be related to structure.

All of the above-described, air-borne methods fail as large area reconnaissance tools. This is true since the information they yield is limited to delineating very large areas of possible interest. These areas must be confirmed and further localized by large scale geological or geophysical operations. In other words, if the most satisfactory air-borne survey system is utilized, it can delineate an area of interest on the order of 10,000 to 100,000 square miles. Ground based geological or geophysical operations must then be used to check likely areas in the 10,000 to 100,000 square mile area. This is in itself a tremendous undertaking and cannot be carried out in most areas where a large scale reconnaissance tool is designed to operate.

Accordingly, it is an object of the present invention to provide an improved method and apparatus for exploring for petroliferous deposits.

Another object of the present invention is to provide an improved method and apparatus for exploring for petroliferous deposits by locating naturally-occurring gas seeps.

Another object of the present invention is to provide an improved and more economical method and apparatus for exploring for petroliferous deposits by locating naturally-occurring gas seeps.

Another object of the present invention is to provide an improved method and apparatus for locating naturally-occurring gas seeps in all types of terrain.

Another object of the present invention is to provide an improved method and apparatus for locating naturally-occurring gas seeps not limited in speed of analysis.

Another object of the present invention is to provide an improved method and apparatus for locating naturally-occurring gas seeps from an air-borne platform.

Another object of the present invention is to provide an air-borne method and apparatus for locating naturally-occurring gas seeps and which is highly suited to large area reconnaissance.

Another object of the present invention is to provide an improved air-borne, large area reconnaissance method and apparatus capable of pinpointing likely petroliferous deposits by locating naturally-occurring gas seeps.

These and other objects and advantages of the present invention will be apparent from a detailed description of the present invention.

Briefly, the invention provides the oil industry with the first satisfactory high-speed, accurate, large scale reconnaissance tool. The invention itself includes a method of and apparatus for pinpointing likely areas of petroliferous deposits by locating naturally-occurring hydrocarbon seeps from an air-borne vehicle. The invention's air-borne capabilities provide fast, economical coverage of even remote and inaccessible regions. The invention's seep detection capabilities provide a direct method for oil exploration and provide the necessary accuracy to pinpoint relatively small areas emitting hydrocarbon seeps.

To appreciate the significance of the inventive steps set forth in the basic method, it is necessary to understand the unique problems facing an air-borne seeps survey. These problems are reviewed below and the solutions to these problems are discussed under subheadings relating to the basic method and its variations.

The major problems faced in developing a practical air-borne seeps survey are entirely different from those encountered in a water-borne seeps survey as disclosed in Slobod et al., 2,918,579, owned by a common assignee, and in pipe line leak detection as disclosed by Thomas, 2,879,663.

Probably the greatest and most confounding problems faced by air seeps detection are gas plume diffusion and dispersion.

In an air-borne seeps operation, the detectors or analyzers are located great distances from the seeps sources. Before the hydrocarbon plumes from the seeps reach the air-borne analyzers, they are subjected to various meteorological conditions, such as changing wind, temperature, humidity, etc., which diffuse and disperse the plumes and add greatly to the problems of detection and location.

In an artificial condition, such as a streamline wind (i.e., where air flow at a given period is constant in magnitude and direction), a gas plume will mix with air by virtue of molecular diffusion. This type of mixing is extremely limited and the gas plume spread is quite small. However, in natural conditions, wind is usually quite turbulent due to the random motion of various eddies present. Since the exact nature of eddies is not known, for purposes of simplicity, the discussion will be limited to a known effect of eddies, i.e., turbulence.

In the lower atmosphere at which seeps plumes exist, turbulence can originate in both thermal processes and in mechanical actions. Since both present serious problems to seeps detection, the thermal processes will be discussed as the first unique problem and then the mechanical action will be detailed as the second unique problem.

It is well known that thermal turbulence originates in the instability of layers of air receiving heat from the earth which has been warmed by solar radiation. It is also well known that the existence of turbulence in the lower layers of the atmosphere depends upon the time of day, state of the upper layers, etc.; that is, when the lower layers are not receiving or losing heat, the change in temperature with height is small and, therefore, atmospheric stability is neutral and there is little or no turbulence due to thermal processes. Conversely, with a temperature lapse; i.e., when there is a marked fall of temperature with height, turbulence is greatly increased causing gas plumes, etc., to diffuse rapidly both vertically and horizontally. As a rule, lapse conditions continue to prevail on clear days from approximately one hour after sunrise to one hour before sunset. On clear, calm nights, atmospheric turbulence is at a minimum since the earth's surface radiates heat causing an inversion in the temperature gradient.

Although it is clear that the intensity of turbulence is related to the mean vertical temperature gradient and to wind speed, according to experimental evidence the two quantities appear in a non-dimensional function (Richardson's number) and thus it is this number and not the individual quantities that determine the strength of the turbulence.

The second serious problem which is related to the thermal problem and also unique to air-borne seeps detection, is the mechanical action or influence of various topographical and cultural objects, such as valleys, forests, mountains, rivers, cities, factories, etc., on plume dispersion and diffusion.

As in the case of the thermal problem, the prior art detectors are not faced with this second problem since they merely follow the known course of a pipe line under inspection thus avoiding obstacles and staying so close to possible leaks that dispersion and diffusion present no difficulty. As pointed out in the first problem discussed, turbulence originates in mechanical actions as well as thermal processes. Friction between the wind and the surface over which it passes produces gustiness. Referring again to the well known Richardson's number, it can be stated that turbulence appears as fluctuations about the mean value of wind speed. The magnitude of these fluctuations is increased by surface irregularities and other obstructions to air flow as well as increases in wind speed. Pronounced topographical features, such as hilly or mountainous regions, valleys, cities, even large groups of buildings, etc., are likely to produce large continuous eddies. The turbulence created by these eddies as in the case of turbulence created by thermal processes increases diffusion and dispersion both vertically and laterally and greatly affects the problem of plume detection from an air-borne platform.

Another serious problem unique to air-borne seeps detection is the presence of artificial sources of hydrocarbons or other predetermined components of interest in the atmosphere.

Exhaust gas from automobiles, refineries, certain manufacturing plants, etc., continuously carry unburned hydrocarbons into the atmosphere. Marsh gas containing methane and other hydrocarbons is continually passed into the atmosphere from decomposing vegetation found in large forested areas, marshes, swamps, etc. Again, the prior analyzers are not concerned with this problem since they traverse a known path that usually avoids artificial sources. In addition, the analyzers are maintained in the immediate vicinity of the pipe line or in the water so that atmospheric contamination by other gases is no problem.

Another problem peculiar only to air-borne seeps detection arises from traversing the area of interest at relatively high speeds.

In Thomas, 2,879,663, the truck-borne pipe line leak detector travels at approximately three to five miles an hour and in Slobod et al., 2,918,579, the craft travels at approximately ten knots. Applicants' air-borne method of detection is capable of traversing an area of interest up to the aircraft's maximum speed. Since the primary function of the new system is to produce a large scale reconnaissance tool, it is necessary to traverse the area of interest at a much greater speed than is possible with the prior art detectors. Therefore, the air-borne method faces a high speed detection problem as well as a naturally-resulting sample-pump capacity problem. Because of the prior art's slow rate of speed, there is no problem in filling their breakout tubes or sample tubes by standard pumping systems.

Still another problem unique to an air-borne seeps survey is the problem of flight safety.

This problem is interrelated with and must be considered when solving the above-mentioned problems. Predetermined survey altitudes, speeds, flight patterns, etc., designed to compensate for plume dispersion and diffusion must be made with an eye to flight safety in the particular area.

Let us now consider the basic method, its variations and how the aforementioned problems are solved.

FIGURE 4 shows a device in block form designed to practice the preferred method of isolating and analyzing.

FIGURE 5 shows one type of scanning analyzer.

FIGURE 6 shows a mosaic or nonscanning type of analyzer.

*Basic Method of Operation*

Figure 1:
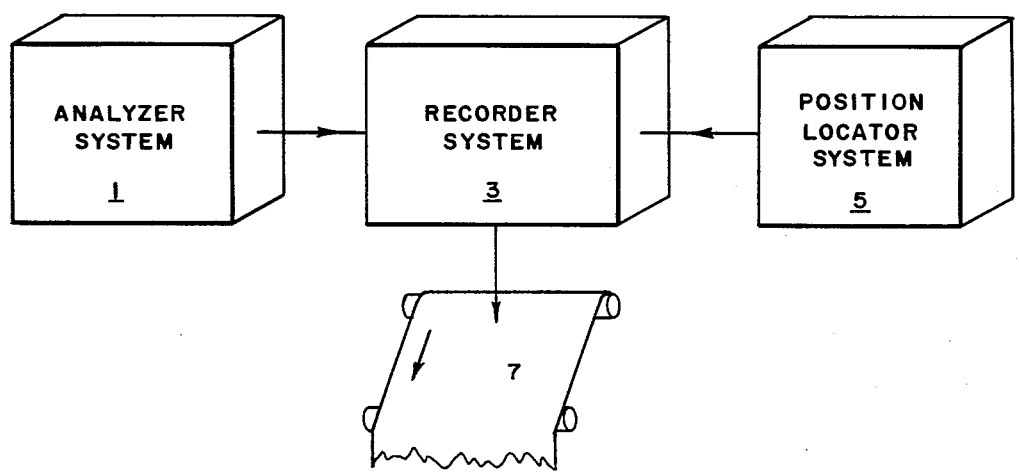
FIGURE 1 shows a block diagram of a device capable of practicing the basic invention.

The basic method of air-borne seeps detection can be practiced by utilizing at least three main variations. Each of these variations can be practiced by various types of devices.

The basic method of operation will be considered first and then the variations and the devices that can practice each variation will be considered.

The unexpected discovery that gas plumes from naturally-occurring seeps do not dissipate beyond recognition and that they can be successfully detected in the atmosphere at relatively great distances from the seeps provides a basis for this first really effective large scale reconnaissance method. The invention, as set forth in the basic method, is not only the first air-borne seeps detection method; it is the first direct method for oil exploration capable of being used as a large area reconnaissance tool.

In view of the skyrocketing costs of conventional seismic and other indirect methods of exploration and in view of the rapidly diminishing number of major structures that are capable of being found by these indirect methods, the importance of the invention cannot be overemphasized.

The basic air-borne seeps detection involves the steps of, (1) conducting an air-borne traverse over an area of interest by traversing a predetermined course at a predetermined altitude, (2) isolating a portion of the atmosphere, (3) analyzing the isolated portion for at least one predetermined component, and (4) recording the presence of the component with relation to the geographical location of analysis.

As will be shown below, the majority of the steps are readily distinguishable from the prior art since among other requirements they must solve the aforementioned problems not faced by prior exploration methods.

The method can be practiced from any type of airborne platform that is capable of meeting the limitations set forth in the remaining steps in the method. Various types of fixed-wing aircraft, helicopters, lighter-than-aircraft, recently developed flying platforms, remote-controlled drones, etc., are suitable devices for conducting the air-borne seeps survey.

The knowledge gained from applicants' extensive research and experimentation in the fields of naturally-occurring hydrocarbon seeps, the detection of the seeps and the various factors that affect the detection of the seeps has provided an unexpected basis for this novel and highly useful exploration tool.

As will be discussed in more detail under appropriate subheadings, the variations, as well as the analyzing principle, used to practice the basic method determine to a great extent how the problems of plume dispersion and diffusion are solved. Generally speaking, the topographical, cultural and meteorological conditions in and over the area to be surveyed must be determined. Each survey must be treated individually and the thermal and mechanical problems peculiar to the ground over which the survey is to be made must be solved in a predetermined manner prior to practicing the survey. According to the conditions present, a suitable survey pattern, altitude or altitudes, directions, speed or speeds, and flight times (night, day, dawn, twilight, etc.) are determined prior to the survey. Of course, if conditions change during the survey, in-flight compensations can be made.

The act of isolating a portion of the atmosphere, along with its variations described under appropriate subheadings, is distinguished from the prior art by the requirement to operate at a preselected altitude or altitude range. The prior art sampled water or air at heights determined by the surface level of the water or terrain involved. The present art is not physically tied to an immediate surface configuration as in the prior art but is conducted at a preselected altitude or altitudes, according to a predetermined plan which compensates for plume dispersion created by surface variations, etc.

Analyzing the isolated portion for at least one predetermined component and recording its location with relation to the earth are necessary to the execution of the over-all method.

After the plumes are detected and tied to geographical locations, it is sometimes desirable to conduct further air-borne or ground-borne seep surveys in the immediate area to tie down the exact location of the seep. The general situation and the accessibility of the ground being investigated determines to a great degree which means is used.

The basic method of operation can be instrumented in many different ways as will be described in detail hereinafter.

FIGURE 1 discloses a device in a block form capable of practicing the invention. The primary components include analyzer system 1, recorder system 3 and position locator system 5. Record 7 can be used if a permanent record of the survey is desired.

Each system or component in FIGURE 1 can be instrumented in numerous ways with certain advantages accruing from each type of instrumentation.

Analyzer system 1 may be a plurality of analyzers or a single analyzer. The physical make-up of the analyzer system depends to a great extent upon the principle of detection and mode of operation used in carrying out the basic method. Various modes and principles of operation that can be used and ways for instrumenting same will be discussed in detail under appropriate headings.

Recorder system 3 can be optical, mechanical, electromechanical or electrical. Permanent, temporary or both permanent and temporary types of records can be utilized in the recorder system. As will be detailed hereinafter, the type of detector system used determines to a certain extent the type of recorder system used.

Position locator system 5 can be an integral part of one or more of the other systems or it can be a separate system. Any type of position locator that is capable of tying analyzer readings to a geographical location can be used. Shoran, Loran, radio direction finding systems, aerial photographs, etc., can be utilized to furnish the necessary information.

If it is desirable to record results of the survey in a permanent or semipermanent fashion, record 7 can be utilized. Such a record can be provided by recording detector readings on aerial photographs, recording detector readings and ground positions on magnetic tape, film, paper tape, etc.

Refer now to the basic method's variations and some of the ways that each variation can be instrumented.

At least two of the three different variations capable of practicing the basic method utilize infrared energy, in one manner or another, to detect the preselected component in the atmosphere. One of these infrared variations can be practiced by using either of two different principles of infrared detection. Regardless of the infrared variation used, a natural source of infrared energy is utilized as opposed to the prior art's use of an artificial source. As a matter of convenience, the two infrared variations have been classified by the manner in which they receive infrared energy from the sun. The first infrared variation is classified as the indirect source sun method and the second infrared variation is classified as the direct source sun method.

The indirect source sun method, as the name implies, does not utilize infrared energy received directly from the sun. As will be detailed under appropriate subheadings, this method can operate by using the infrared absorption or the infrared emission principle of detection. If the absorption principle is used, the sun's infrared radiation which is reflected by the earth is utilized. If the emission principle is used, the sun's infrared radiation is utilized to heat preselected components in the atmosphere so that they emit their own characteristic infrared frequencies which are detected.

The direct source sun variation includes the methods that utilize infrared energy received directly from the sun.

The third or non-infrared variation of the basic method operates without the requirement for infrared energy and utilizes the flame ionization principle to detect the preselected components.

Indirect Source Sun Method

All of the methods included in this classification are embodiments of the basic air-borne seeps survey method. These methods utilize a long path portion of the earth's atmosphere in place of a test cell and the infrared absorption principle or the infrared emission principle of detection. The methods utilizing the infrared absorption principle use the atmosphere between the earth and the air-borne analyzer as a sample chamber. The methods utilizing the infrared emission principle can use either the portion of the atmosphere between the earth and the air-borne analyzer or a portion of the atmosphere between a point in the sky (other than the sun) and the analyzer.

The advantages of the indirect source sun methods include those found in the basic method plus the advantages accruing from the ability to use much higher surveying altitudes than is possible in other variations. All methods included in the indirect source sun classification except the "point in the sky" variation of the emissive method view the atmosphere between the analyzer and the earth and, therefore, are not limited by the gas plume altitude. By increasing the altitude of the survey, the area covered per traverse is increased and the amount of this increased coverage is limited mainly by the resolution of the optics in the system used.

The infrared absorption principle can be utilized to practice the indirect source sun variation by, (1) performing an air-borne traverse over an area of interest by traversing a predetermined course at a predetermined altitude, (2) isolating a portion of the atmosphere between an analyzer and the earth, (3) analyzing the isolated portion for at least one predetermined component by measuring the infrared energy absorbed, and (4) recording the presence of the component with relation to the geographical location of the analysis.

If the infrared emission principle is used to practice an indirect source sun variation, the following modifications in Steps 2 and 3 of the above-recited infrared absorption method are required. Depending on the most desirable long path to be used, a portion of the atmosphere between the analyzer and the earth or between the analyzer and a point in the sky is isolated. In addition, the isolated portion is analyzed for the predetermined component by measuring the infrared energy emitted by the preselected component or components.

Regardless of the type of indirect source sun method used, certain physical steps must be taken to minimize local surface interference with gas plume detection.

Figure 2:
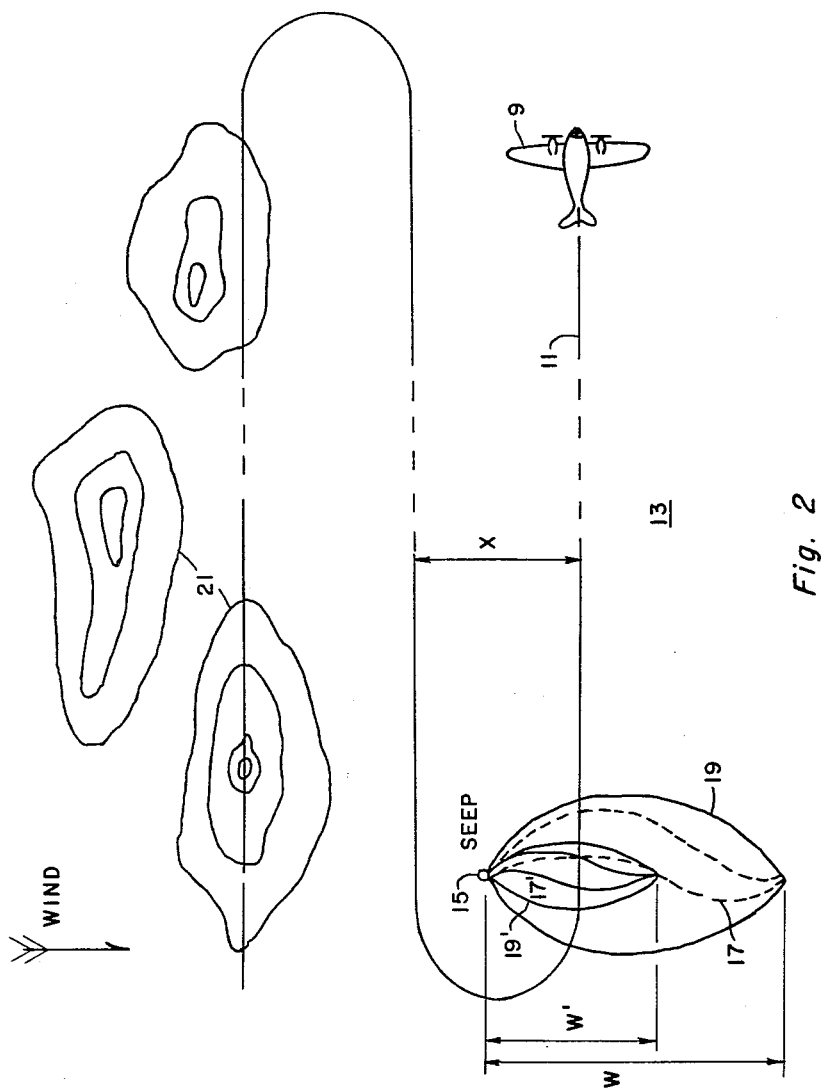
FIGURE 2 shows an aerial view of a seeps survey.

To illustrate some of the problems involved in localizing interference, refer to FIGURE 2 which discloses an air-borne vehicle 9 executing a preplanned traverse 11 over a portion of the earth's surface 13 containing a hydrocarbon seep 15 of a given size. At the time of the traverse, wind is blowing in a direction as shown at a speed U. Seep 15 is shown under conditions of two wind speeds U and U′ where 17 represents an instantaneous contour of an equal parts per million concentration under given wind speed U and 17′ represents the same contour under a greater wind speed U′. For purposes of clarity, contour 17 is drawn in dotted lines so that it stands apart from 17′. The plume boundaries of each contour (limits of contour movement over a given period of time) are represented by 19 and 19′, respectively, while the downwind length of each plume is represented by W and W′, respectively. As will be shown hereinafter, distance X between adjacent legs of traverse 11 is mainly dependent on wind speed U. The altitude or altitudes at which craft 9 executes traverse 11 depends upon the basic method variation used and in some cases also upon meteorological, cultural and topographical conditions, such as mountains 21, etc.

Now let us consider for a moment all methods included in the indirect source sun classification except the "point in the sky" emission method. If a scanning or nonscanning type apparatus is used which only samples the area of interest, certain meteorological conditions must be considered which can be ignored if complete area coverage is used. For example, if a scanning or nonscanning device is used to sample (in a conventional sawtooth or square wave manner) across and perpendicular to the direction of traverse, the speed of traverse must be adjusted for wind conditions affecting the size of the plume.

If the speed of traverse is not adjusted and the scan rate is constant, it is possible for the analyzer to fly over a seep and fail to detect it since the plume may be located in an area where the sample scans do not overlap. Therefore, minimizing interference with gas plume detection is important and requires determining the speed and direction of the wind as well as physical obstructions that can change its speed and direction. However, if area coverage is produced, this problem does not exist since the plume will be included in the coverage regardless of the wind conditions.

Heavy cloud conditions, smog, haze, shadows, etc., between the analyzer and the gas plume must always be determined and considered since their presence seriously affects the success of all indirect source sun variations. These conditions affect the amount of the sun's radiation received by the earth and in turn the amount of infrared energy reflected by the earth. In other words, to minimize the effect of these conditions on plume detection, it is necessary to locate and determine the amount of haze occurring from natural conditions, the amount of haze and smoke emanating from cultural conditions, such as manufacturing plants, large cities, etc., and the amount of other possible interference, such as shadows caused by large mountains, buildings, etc. After the interfering conditions are determined, the survey is made in a manner to circumvent their effects. Depending on the situation, this can be done by flying below the conditions, around the conditions, delaying the survey until the conditions change, etc.

Another possible meteorological condition that can seriously affect the detection of gas plumes is large variations of humidity in the area of interest. The presence of these variable amounts of moisture in the atmosphere may produce erroneous indications of methane due to overlapping of the methane and water vapor absorption bands in the infrared energy range.

To minimize this condition, it may be necessary to fly under the clouds containing the moisture, delay the survey until the clouds dissipate, bypassing the clouds if the conditions and the optics of the system permit, or, in some cases, changing the wave length interval to be analyzed to one less affected by the particular conditions, i.e., from the 3.2–3.5 micron $CH_4$ absorption band to the 2.2–2.4 micron $CH_4$ absorption band.

The preferred method of carrying out the isolating and analyzing steps necessary in the indirect source sun variations includes focusing a filtered and an unfiltered infrared picture of the isolated portion on a focal plane or planes and balancing the two pictures so their differences appear as an output.

It should be understood, however, that if the background level against which the component of interest is being analyzed does not vary, a balancing operation is not required. In that case, a single analyzing unit, such as a Golay detector or the like, can be used as the analyzer system 1 in FIGURE 1. The general recorder system 3 and position locator system 5 can remain the same as described heretofore. Of course, nonvarying background conditions occur very seldom, usually in a cloudless sky or during night operations. During the great majority of seeps surveys, the conditions are such that the background level must be compensated for.

The indirect source sun variation can be instrumented in various ways.

Figure 3:
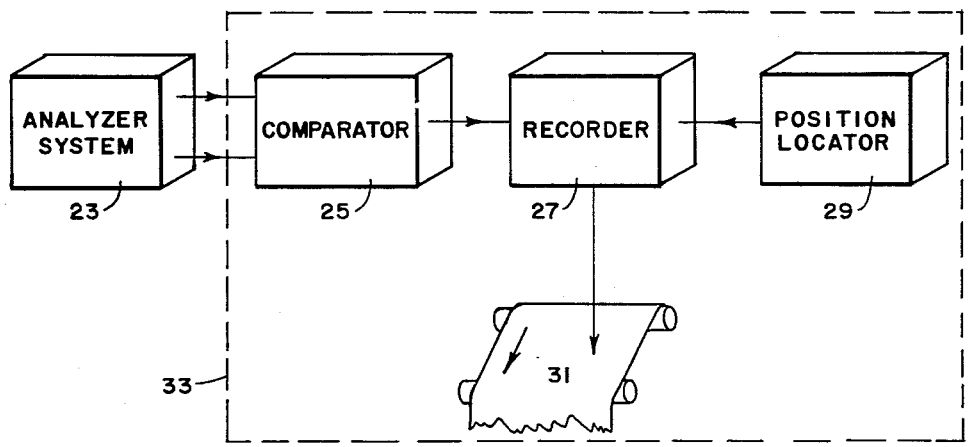
FIGURE 3 shows a block diagram of a device capable of practicing the infrared variations of the basic invention.

FIGURE 3 discloses a block diagram of a device capable of practicing this variation of the basic method. The primary components disclosed in FIGURE 3 include analyzer system 23, comparator 25, recorder 27, position locator 29 and record 31. Components 25, 27, 29, and 31, for ease of explanation, hereinafter have been included in dashed block 33.

FIGURE 4 discloses a device in block form designed to carry out the preferred method of isolating and analyzing a predetermined component. Analyzer system 23 is shown in schematic form and includes infrared cameras 35 and 37, focal planes 39 and 41, methane filter 43 and output lines 45 and 47. It should be noted, however, that if the "point in the sky" variation of the emissive method described above is practiced, area coverage is not utilized since it views a point instead of an area, such as a portion of the earth.

To practice one of the indirect source methods with a scanning type analyzer, an instrument, such as shown in FIGURE 5, can be used. FIGURE 5 discloses analyzer 23 containing scanning heads 49 and 51, optical systems 53 and 55, preselected infrared detectors 57 and 59, preselected filter 43 and output lines 45 and 47.

In operation, analyzer 23 and components 33 are flown over an area of interest at a preselected altitude (usually between 1,000 and 5,000 feet above ground level depending on conditions of the survey) and on a predetermined course. Scanning heads 49 and 51 are set to move in automatic sector scan across the flight course picking up infrared energy from the earth and reflecting same through appropriate optical systems 53 and 55 that focus the energy on infrared detectors 57 and 59. Infrared detectors 57 and 59 are preselected so their sensitivity range includes one or more of the component of interest's characteristic absorption frequency bands. Of course, the optical system can be made frequency selective, if desired, or, both can be utilized to determine the system's over-all sensitivity range. Filter 43 (in this case, a methane filter since the component of interest is methane) used with camera 37 absorbs the infrared energy in the methane absorption spectrum (peaks at 2.3, 3.4 and 7.7 microns) and passes the remaining infrared energy to head 51 and on to detector 59. Unfiltered camera 35 receives energy from the entire infrared spectrum and passes same to detector 57. The output energy from the infrared detectors is transmitted through lines 45 and 47 to comparator 25 in block 33, FIGURE 3. Prior to the surveying operation, the outputs of cameras 35 and 37, FIGURE 5, are adjusted to a null position so that fractional parts per million of methane (above the natural background level of 0.5 to 1.5 parts per million) will unbalance the outputs of the two cameras. Assuming that methane plumes are present in the inspected area, outputs from infrared detectors 57 and 59 are transmitted through 45 and 47 to comparator 25 in FIGURE 3. Depending upon the type of comparator system used, the outputs are combined to electrically, optically or mechanically buck out or cancel similarities and present a difference. This difference indicates the presence of methane plumes in the inspected area and is recorded by 27 along with the location of the detected plume.

Various types of equipment can be utilized to produce a suitable scanning operation. The scanning system found in the infrared camera produced by Barnes Engineering Company of Stamford, Connecticut, is a satisfactory instrument. Of course, other well known types of mechanical, electromechanical, etc., scanning systems for aerial photograph systems or certain navigational radar systems can be used. In most cases, it is best to utilize only the profiler portion of the system and coordinate the speed of the craft so its movement produces area coverage.

FIGURE 6 discloses a nonscanning system for providing area coverage on each traverse. In this system, area coverage is obtained by utilizing a plurality of suitable infrared detectors whose sensitivity includes the characteristic absorption frequencies of the component of interest. The detectors are arranged in a physical configuration so that the individual detector outputs combine to produce a mosaic of a portion of the earth under the traverse. Analyzer system 23 includes rectangular groups 61 and 63 of detectors 57 and 59 arranged so that two mosaics of the earth's surface are transmitted through outputs 45 and 47 to block 33. Filter 43 is again utilized to absorb the predetermined element's infrared energy spectrum. Suitable optical systems 53 and 55 are used to focus the infrared energy on detector groups 57 and 59. Prior to conducting the survey, the filtered output from 59 is balanced against the unfiltered output from 57 to produce a null condition. As in the operation of FIGURE 5, this compensates for the naturally-occurring amount of the component of interest in the atmosphere.

Another type of nonscanning system for presenting area coverage substitutes two single rows of detectors for the two rectangular groups shown in FIGURE 6. One row of detectors 57 from group 61 and one row of detectors 59 from group 63 are arranged perpendicular to the direction of traverse. By synchronizing the speed of traverse with the speed of the over-all comparator and recording system 33, a modified form of "slit photography" is practiced; i.e., each row of individual detectors produces a total output that covers an area of earth along the line of traverse. Otherwise, the system is balanced and operated the same as the device described in FIGURE 6.

Another type of nonscanning instrumentation involves the use of two commercially available devices known as Evapographs and produced by Baird-Atomic, Inc., of Cambridge, Massachusetts. These devices operate on the principle that oil film thickness on a membrane can be controlled by the amount of heat (infrared radiation) focused thereon. By monitoring an area of interest, a heat picture is impressed on the membrane. The point-to-point temperature variations alter the thickness of the oil film on the rear of the membrane and variations in thickness cause a white light to be reflected as different colors giving a visibly colored thermal image of the field of view. The thermal picture is usually recorded on film although it can be monitored optically or electrically. This type of instrumentation is somewhat slower than the other systems described and, therefore, the speed of traverse must be reduced accordingly.

The instrumentation can be practiced by a device, as shown in FIGURE 4, where two Evapographs are used as infrared cameras 35 and 37. The operation of the over-all device is the same as that described in FIGURE 4.

Figure 7:
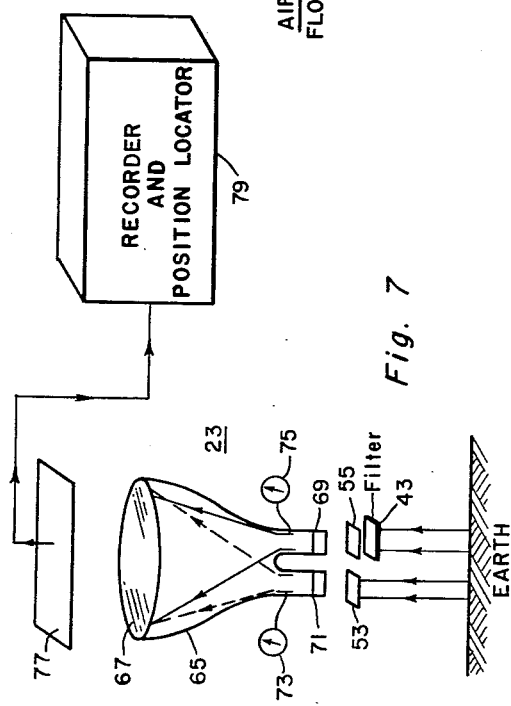
FIGURE 7 shows a second type of nonscanning analyzer.

FIGURE 7 discloses still another type of nonscanning instrumentation capable of practicing the indirect source sun method of operation. In this case, detector system 23 can be two infrared image tubes or a single envelope 65 containing two viewing necks, as shown in FIGURE 7. The tube contains a phosphor screen 67, cathodes 69 and 71, appropriate optical systems 53 and 55, filter 43 and control system 73 and 75. A photographic, electronic or optical reading system shown schematically as 77 relays the output of tube 65 to recorder and position locator 79.

In operation, infrared radiation from the earth is projected through the filtered and unfiltered optical systems to cathodes 69 and 71. The amount of electrons emitted by each cathode is proportional to the amount of infrared energy focused thereon. One control system, 73 or 75 (in this case, 75), is constructed to cause the infrared radiation projected on one cathode to present a negative picture on the phosphor screen 67. This type of operation can be done in the same manner as practiced by a television broadcasting station in presenting a negative picture on a television screen. Prior to operation, controls 73 and 75 are adjusted to cancel out the background level of the component of interest so that a no picture condition exists on screen 67. This is done by making the negative and positive pictures projected on screen 67 equal so that the two pictures of the inspected area cancel. After the system is balanced, the component of interest is detected by an output (unbalanced condition) from tube 65. This output is detected electrically, photographically, optically, etc., by 77 and recorded with its appropriate ground position by 79. If desired, screen 67 can also be monitored visually.

Under certain conditions it may be desirable to substitute two image tubes for tube 65. In this case, a comparator, recorder and associated elements shown as 33 in FIGURE 3 can be used. Of course, the output of one tube is reversed in polarity. The outputs of the two tubes are then balanced and operated electrically, photographically, etc., to indicate the presence of a component of interest by an unbalanced condition.

Various types of position locators can be utilized with the image tube system. If an intermittently operating locator is desired, an automatic switch can be used to temporarily cut out one picture during the unbalanced condition thus causing an infrared picture of the earth at an instant when a gas plume is detected. This picture can be recorded on film by a camera positioned above screen 67. If a continuous type position locator is desired, various aerial photographic systems can be used.

The "point in the sky" emission method can be instrumented by a device such as shown in FIGURE 4. However, it should be noted that since a point in the sky (other than the sun) is being viewed by analyzer system 23, the system is oriented so that it views the sky instead of the earth as shown. With the exception of the scanning heads or other type equipment to provide area coverage, the device described in FIGURE 4, or one of its variations, can be used to practice the "point in the sky" method.

*Direct Source Sun Method*

The direct source sun method is a second variation of the basic air-borne seeps survey method. This variation utilizes the infrared absorption principle of detection, the atmosphere between the detector and the sun as the sample and the sun as the source of infrared energy.

The advantages of the direct source sun method include those found in the basic method plus the advantage that it can be modified to operate on a water or land craft in special applications.

In practicing the remote source sun method, the analyzer must be flown or moved under a portion of the gas plume so that at least that portion is between the analyzer and the sun. A flight altitude of approximately 50 to 100 feet fulfills the requirement for covering a sizeable area per traverse and the requirement for insuring that the detector is not above the seep plume. Of course, the invention in not limited to a given altitude and with changing conditions and circumstances, the most desirable altitude can vary materially.

The broad remote source sun method can be described as, (1) conducting an air-borne traverse over an area of interest by traversing a predetermined course at at least one predetermined altitude, (2) isolating a portion of the atmosphere between an analyzer and the sun, (3) analyzing the isolated portion for at least one predetermined component by measuring infrared energy absorbed, and (4) recording the presence of the component with relation to the geographical location of analysis.

Let us now examine some of the unique steps found in the direct source sun method of operation.

Although minimizing local surface interference with gas plume detection is important in the indirect source sun variation, it is much more important in the direct source sun variation since the analyzer must move through at least a portion of the gas plume instead of looking down upon it as in the prior method. Because of this requirement to stay within or below the gas plume, all of the significant meteorological, topographical and cultural conditions that affect plume height (as well as plume size and shape) are determined to minimize local interference with gas plume detection. A complete discussion of these conditions, how they may vary, how these variations affect gas plume height, dispersion, etc., and how the analyzer may minimize their affects is given under the flame ionization subheading.

The preferred method of carrying out the isolating and analyzing steps in the direct source sun variation is the same as the preferred method in the indirect source sun variation. However, in this case, area coverage is not used and the filtered and unfiltered analyzers continuously or intermittently view the sun instead of a portion of the earth. The outputs of the two detectors are balanced so that a no signal condition indicates the absence of a preselected component and a signal indicates the presence of same.

FIGURE 3 discloses a block diagram of a device capable of practicing the direct source sun variation of the basic method. In using FIGURE 3 to practice the direct source sun operation, the same basic systems described in the indirect source sun operation can be used. However, since the analyzer system 23 is positioned to view the sun which is a point source instead of the earth which is an area source, it is not necessary to use a scanning or mosaic type system.

Figure 8:
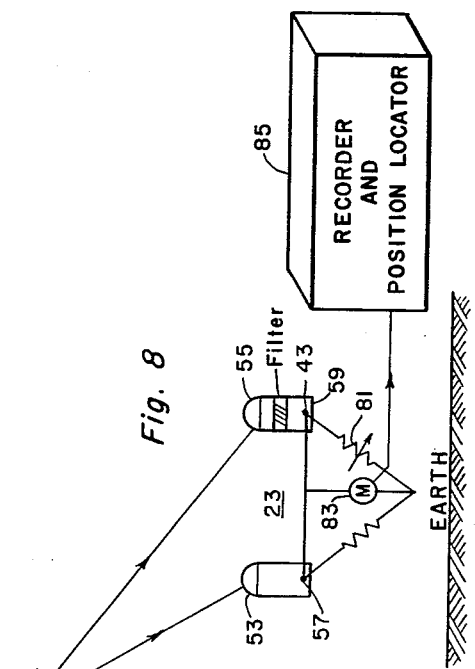
FIGURE 8 shows a third type of nonscanning analyzer.

FIGURE 8 discloses a schematic drawing of a device capable of practicing the remote source sun method of operation. The analyzer system 23 includes two infrared detectors 57 and 59 connected to a modified wheatstone bridge circuit as shown. The infrared detectors utilize optical systems 53 and 55 and an appropriate filter 43, such as described in paragraphs relating to FIGURES 4–7. To balance the outputs of the two detectors in this system, variable resistor 81 is adjusted until meter 83 connected across the bridge reads zero.

In operation, the device traverses a predetermined course, at a predetermined altitude and in a manner so that analyzer 23 continuously views the sun. When a plume containing a preselected component is encountered, the plume absorbs its characteristic frequencies and less infrared energy falls on the unfiltered detector 57 than in the null condition. Of course, little or no change occurs on filtered detector 59. Galvanometer 83 indicates the bridge's unbalanced condition and the resulting flow of current. The flow of current, which indicates the presence of the preselected component, is recorded electrically, photographically, mechanically, etc., along with its geographical location by recorder and position locator 85.

*Flame Ionization Method*

The flame ionization method is a third variation of the basic air-borne seeps survey. This variation utilizes the flame ionization principle of detection and isolates a portion of the atmosphere adjacent the analyzer.

The advantages of the flame ionization variation include those found in the basic method plus the advantages of twenty-four hour operation and the ability to operate on a water or land traversing craft for special applications.

In practicing the preferred embodiment of the flame ionization method, the air-borne analyzer flies above the earth at a preselected altitude and in a preselected manner. As in the direct source sun method, the analyzer must be flown or moved through a portion of the gas plume so that a reading may be taken. Experience has proven that for this variation an altitude range of from 25 to 200 feet provides good results under average conditions. As in the remote source sun method altitude ranges other than the preferred range are also suitable depending upon the general conditions and circumstances surrounding the survey.

The broad flame ionization method can be described as, (1) performing an air-borne traverse over an area of interest by traversing a predetermined course at at least one predetermined altitude, (2) isolating a portion of the atmosphere adjacent an analyzer, (3) analyzing the isolated portion for the presence of at least one predetermined component by flame ionization, and (4) recording the presence of the component with relation to the geographical location of the analysis.

FIGURE 1 discloses a device in block form capable of practicing the flame ionization variation of the basic method. No scanning or mosaic coverage is necessary in this method, since the detector system 1 isolates the atmosphere adjacent the detector. Probably the most satisfactory analyzer to use in practicing the flame ionization variation is a modified Perkin-Elmer Hydrocarbon Detector, Model 213.

Figure 9:
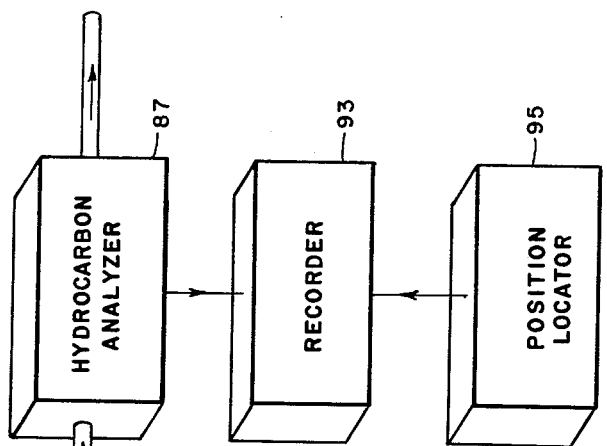
FIGURE 9 shows a block diagram of a device capable of practicing the flame ionization variation of the basic invention.

FIGURE 9 discloses in more detail a device designed to perform an air-borne seeps survey by detecting the presence of hydrocarbon gases by the flame ionization method. Analyzer 87 is a Perkin-Elmer Hydrocarbon Detector, Model 213, whose sensitivity has been modified to present a reading of 0.1 part per million full scale. A sample tube 89 is connected between intake nozzle 91 and analyzer 87. Intake nozzle 91 can be a single or multi-aperture type of nozzle. It has been found that the multi-aperture type is the most satisfactory for airborne work since it samples from a number of points, thus covering an area and thereby averaging a number of samples so that the background peaks are reduced, the chance of missing a plume is lessened, etc. Various nozzle configurations, such as circles, rectangles, X's, Y's, etc., have been used. Regardless of the configuration used, the diameter of a single aperture should pass no more than $1/X$ of the total sample flow where $X$ is the number of apertures.

Referring now to FIGURE 2, let us assume that a device, such as shown in FIGURE 9, is used to practice the flame ionization variation of the basic method of conducting an air-borne seeps survey over an area of the earth's surface 13, FIGURE 2.

After the area to be surveyed has been selected, the general topographical conditions are determined from maps, aerial photographs or even aerial reconnaissance. The presence of large topographical and cultural features, such as mountains, valleys, cities, etc., are located.

Next, the meteorological conditions over the area are determined. In this case, the presence of heavy cloud formations are only considered for flight safety purposes since the moisture content does not interfere with the flame ionization process. However, large clouds of smog or other contaminants containing hydrocarbons should be noted. The direction of the wind is important since legs of traverse 11, FIGURE 2, are positioned perpendicular to the direction of the wind. This increases the possibility of detecting a portion of all seeps by exposing the largest section of the seeps to the traverse. The speed of the wind U is important since it is usually the main factor in determining distance W and X. W is downwind length of contour 17 which outlines an area containing a preselected concentration of the component of interest (i.e., methane, ethane, hydrocarbons, etc.) at a particular altitude. With an increase in wind speed, length W and altitude Z of a contour 17 decrease. This is borne out by the charts in FIGURES 9 and 10.

Figure 10:
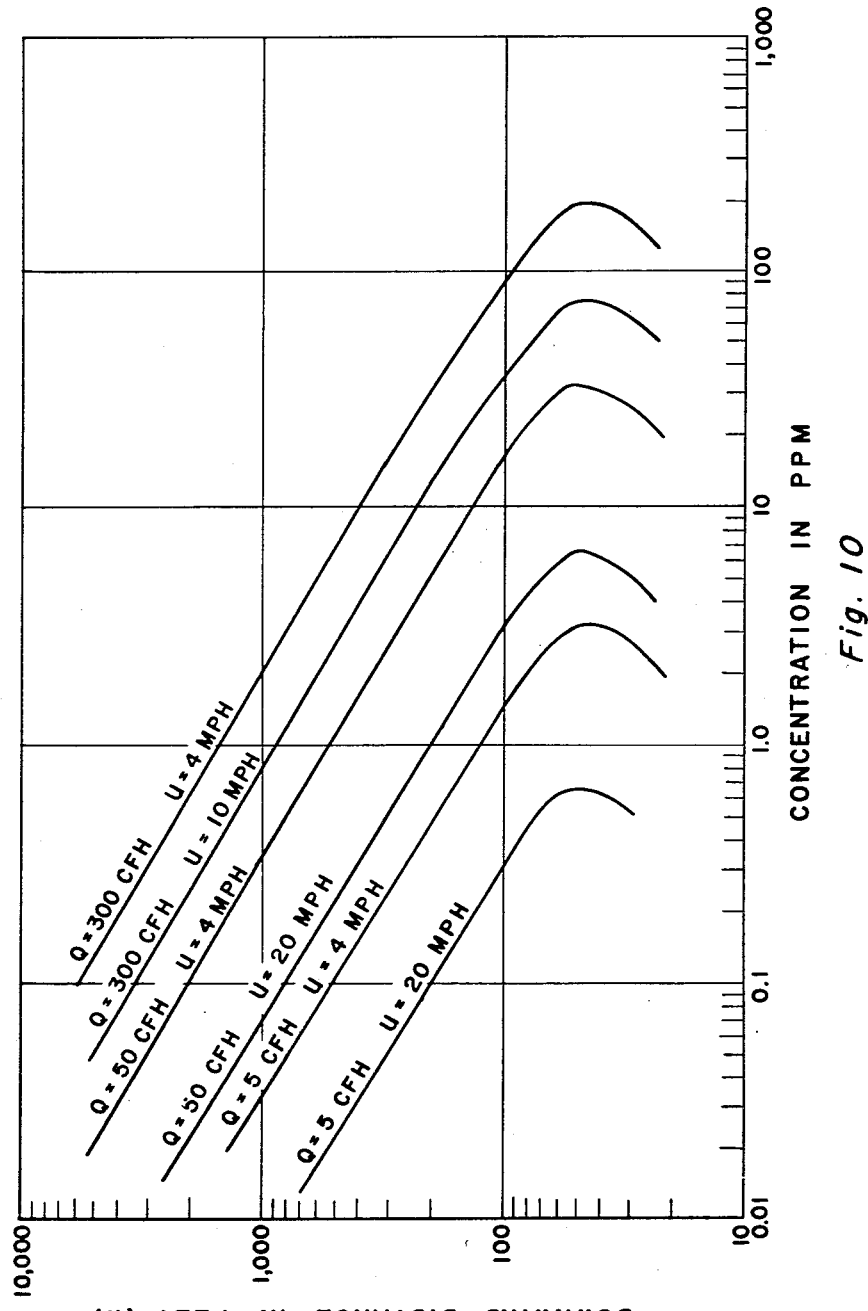
FIGURE 10 is a graph showing the effects of changes in wind velocity on plumes from various size seeps.

FIGURE 10 discloses the effects of different velocities on various size seeps. The effects are plotted in terms of downwind distance in thousands of feet versus concentrations in parts per million. It should be noted that downwind distance in this chart corresponds to W in FIGURE 2 at ground level.

Figure 11:
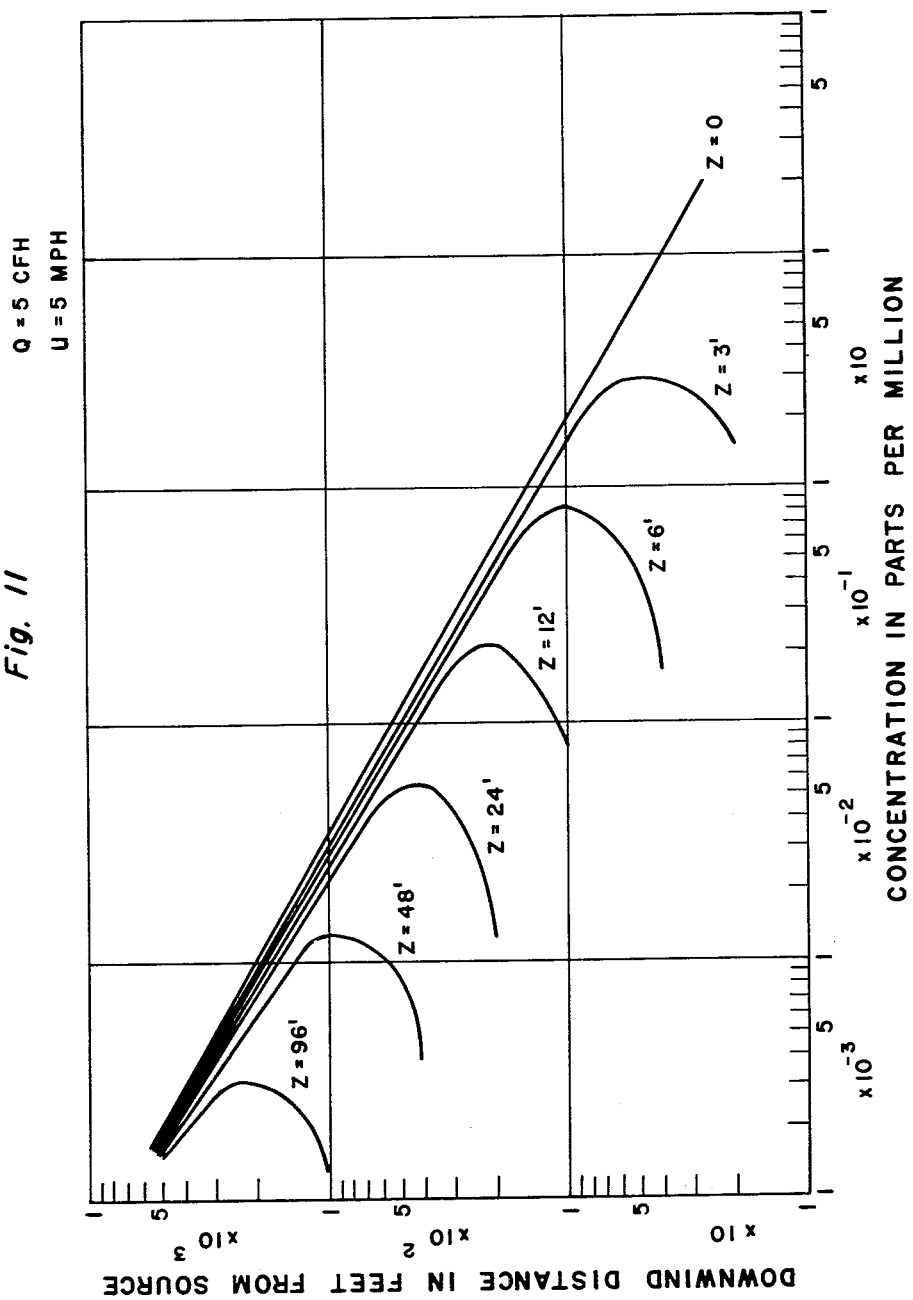
FIGURE 11 is a graph showing the effects of changes in altitude on plume length of a given seep.

FIGURE 11 shows the effects of altitude on a given seep. The effects are plotted in terms of concentration in parts per million versus downwind distances in feet. The plots of concentration versus distance are made from altitudes ranging from zero to 96 feet above the surface of the earth containing the seep.

Both charts are made from data derived from Sutton's equation for determining diffusion from a point source on the surface of the earth. See Quarterly Journal of the Royal Meteorological Society (London), vol. 73 (1947), pages 257 and 426, and Proceeding of the Royal Society (London), vol. 135A (1932), page 143.

Although this data was derived from the equation, it has been verified by numerous experiments which show the test data and calculated data to be of the same order of magnitude.

With the topographical, cultural and meteorological conditions in the area determined and the sensitivity of the system known, a survey traverse can now be developed. As indicated in FIGURE 2, most of the area 13 to be surveyed is flat or rolling terrain. Therefore, distance X between legs of traverse 11 is determined by wind velocity in the area. Assuming it is desirable to pick up all seeps producing 5 cubic feet or more per hour with the wind blowing in the direction shown in FIGURE 2 at a velocity U of 5 m.p.h., FIGURE 11 can be used to determine the minimum downwind distance W, FIGURE 2, under the given wind conditions. Knowing the sensitivity of the survey instrument to be 0.1 part per million full scale (and capable of being read to .01–.02 part per million), FIGURE 11 is entered at .02 p.p.m. concentration. At an altitude of 24 feet, the downwind distance W of a 5 c.f.h. seep is 1,100 feet. To insure that the seep is detected by at least one of the traverse legs 11, distance X is made less than 1,100 feet. If the survey is only interested in larger seeps, say 50 c.f.h. or above, the vertical axis of chart 11 can be moved to the left by a factor of 10. Thus, a concentration of .02 p.p.m. would produce a downwind distance W of 2,000 feet at an altitude of 96 feet (assuming the wind conditions remained as above).

After the distance X and flight altitude Z have been determined for the traverse over the relatively flat portion of area 13, let us consider how mountains 21 influence plume dispersion and may require a change in the traverse. Depending upon the height and extent of mountains 21, traverse 11 can be routed around or over the mountains. If flight safety allows and operating conditions require that craft 9 fly over the mountains, distance X over this part of the traverse is decreased. Assuming that other conditions remain constant, FIGURE 11 shows how downwind distance W, FIGURE 2, decreases as altitude Z increases for the given conditions. Remembering that large topographical features, such as mountains, increase turbulence and gas plume dispersion, it is necessary to decrease X sufficiently to correct for increased dispersion as well as increased altitude. Noting the complication arising from flying over mountains or other topographical anomalies, it is obvious that it is better whenever possible to route the traverse around instead of over the anomalies. This is especially true when small seeps, such as 1 to 5 c.f.h., are of interest. Of course, if infrared variations are used, this problem is not present or at least not as serious.

In performing the survey, the device as shown in FIGURE 9 is maneuvered in craft 9 over area 13, FIGURE 2. The local surface interference with gas plume detection is minimized by flying the predetermined course 11 at predetermined altitudes Z so that mountains 21, heavy cloud formations, etc., are avoided or compensated for as described heretofore. A portion of the atmosphere at altitude Z is isolated by intake nozzle 91 and this portion of the atmosphere is analyzed by hydrocarbon analyzer 87. The atmosphere can be analyzed for total hydrocarbons or ethane and methane only. If it is desirable to analyze for ethane and methane only, a molecular sieve can be used to eliminate other hydrocarbons and contaminants from the sample air stream. Regardless of whether all or preselected hydrocarbons are analyzed, analyzer 87 operates on the flame ionization principle. As is well known in the art, the flame ionization principle detects hydrocarbons by mixing a sample gas containing same with hydrogen and burning the mixture in an enclosed chamber. The burning ionizes combustibles in the sample and ions produced therefrom are collected and measured with the aid of a surrounding electrical field. The carbon content of the sample gas is directly proportional to the changes in ion current.

Various types of recorders 93 and position locators 95 can be used. For instance, recorder 93 can be a conventional magnetic, paper tape, photographic or ink recorder. Position locator 95 can be an aerial photographic type, a

We claim:

1. A method of surveying a large geographical area to determine the location of small volumes of seeping gases passing into the atmosphere from naturally-occurring, subsurface deposits of hydrocarbons, comprising:
    (a) establishing the distribution pattern of a preselected, minimum volume of seeping gas passing into the atmosphere under the meteorological, cultural and topographical conditions existing in the area of survey,
    (b) continuously crossing said area of survey by following a predetermined pattern of plural traverses,
    (c) simultaneously with said crossing of said area of survey continuously isolating volumes of the atmosphere above said area of survey, which include at least a portion of the atmosphere within said established distribution pattern of seeping gas during at least two adjacent traverses,
    (d) continuously examining said isolated volumes of the atmosphere for naturally-occurring indications of the presence of hydrocarbon gases therein, and
    (e) recording detected indications of the presence of said hydrocarbon gases with relation to the geographical locations of said indications of hydrocarbon gases.

2. A method in accordance with claim 1 wherein the predetermined pattern of plural traverses is adjusted to compensate for changes in the meteorological, cultural and topographical conditions of the area of survey.

3. A method in accordance with claim 1 wherein the naturally-occurring indications are changes in infrared energy resulting from the presence of the hydrocarbon gases.

4. A method in accordance with claim 3 wherein the changes in infrared energy result from the absorption of infrared energy by the hydrocarbon gases.

5. A method in accordance with claim 3 wherein the changes in infrared energy result from the emission of infrared energy by the hydrocarbon gases.

6. A method in accordance with claim 1 wherein the naturally-occurring indications are the hydrocarbon gases themselves.

7. A method in accordance with claim 6 wherein the examination is carried out by flame ionization techniques.

8. An airborne method of surveying a large geographical area to determine the location of small volumes of seeping gases passing into the atmosphere from naturally-occurring, subsurface deposits of hydrocarbons, comprising:
    (a) establishing the distribution pattern of a preselected, minimum volume of seeping gas passing into the atmosphere under the meteorological, cultural and topographical conditions existing in the area of survey,
    (b) continuously crossing said area of survey with an airborne vehicle by following a predetermined pattern of plural traverses,
    (c) simultaneously with said crossing of said area of survey continuously isolating volumes of the atmosphere above said area of survey, which includes at least a portion of the atmosphere within said established distribution pattern of seeping gas during at least two adjacent traverses and outside the limits of that portion of the atmosphere susceptible to sampling by a moving land-borne vehicle,
    (d) continuously examining said isolated volumes of the atmosphere for naturally-occurring indications of the presence of hydrocarbon gases therein, and
    (e) recording detected indications of the presence of said hydrocarbon gases with relation to the geographical location of said indications of hydrocarbon gases.

9. A land-borne method of surveying a large geographical area to determine the location of small volumes of seeping gases passing into the atmosphere from naturally-occurring, subsurface deposits of hydrocarbons, comprising:
    (a) establishing the distribution pattern of a preselected, minimum volume of seeping gas passing into the atmosphere under the meteorological, cultural and topographical conditions existing in the area of survey,
    (b) continuously crossing said area of survey by following a predetermined pattern of plural traverses of sufficiently close proximity to one another that said distribution pattern of seeping gas is crossed by at least two of said traverses,
    (c) simultaneously with said crossing of said area of survey continuously isolating volumes of the atmosphere above said area of survey,
    (d) continuously examining said isolated volumes of the atmosphere for naturally-occurring indications of the presence of hydrocarbon gases therein, and
    (e) recording detected indications of the presence of said hydrocarbon gases with relation to the geographical locations of said indications of hydrocarbon gases.

References Cited in the file of this patent

UNITED STATES PATENTS

| | | |
|---|---|---|
| 1,691,138 | Schmick | Nov. 13, 1928 |
| 2,165,214 | Blau et al. | July 11, 1939 |
| 2,412,165 | McDermott | Dec. 3, 1946 |
| 2,786,144 | Weisz | Mar. 19, 1957 |
| 2,918,579 | Slobod et al. | Dec. 22, 1959 |
| 2,935,614 | Teichmann et al. | May 3, 1960 |
| 2,950,392 | Campbell | Aug. 23, 1960 |
| 2,975,283 | Morton | Mar. 14, 1961 |
| 3,032,655 | Romans | May 1, 1962 |
| 3,056,958 | Anderson | Oct. 2, 1962 |